United States Patent
Li et al.

(10) Patent No.: US 7,372,643 B1
(45) Date of Patent: May 13, 2008

(54) IMAGE-FORMING LENS SET

(75) Inventors: Hung-Chih Li, Taichung (TW); Shih-Han Chen, Taipei County (TW)

(73) Assignee: Genius Electronics Optical Company, Ltd, Taichung (TW)

( * ) Notice: Subject to any disclaimer, the term of this patent is extended or adjusted under 35 U.S.C. 154(b) by 0 days.

(21) Appl. No.: 11/749,985

(22) Filed: May 17, 2007

(51) Int. Cl.
*G02B 3/02* (2006.01)
*G02B 9/12* (2006.01)

(52) U.S. Cl. ...................... 359/784; 359/716
(58) Field of Classification Search ................ 359/708, 359/716, 784, 785
See application file for complete search history.

(56) References Cited

U.S. PATENT DOCUMENTS 6,795,253 B2 * 9/2004 Shinohara .................... 359/716
7,196,855 B2 * 3/2007 Yamaguchi ................. 359/785

* cited by examiner

*Primary Examiner*—Huy Mai
*Assistant Examiner*—Jack Dinh
(74) *Attorney, Agent, or Firm*—Browdy and Neimark P.L.L.C.

(57) ABSTRACT

An image-forming lens set includes an aperture stop, a first lens with positive power, a second lens with negative power and a third lens, which are arranged from an object side order. The first lens has two opposite surfaces including a convex surface facing the object side, and at least one of the two opposite surfaces is a non-spherical surface. The second lens has two opposite surfaces including a concave surface facing the object side, and at least one of the two opposite surfaces of the second lens is a non-spherical surface. The third lens has negative refractive power becoming greater from a center to a periphery of positive refractive power. The third lens has two non-spherical opposite surfaces including a convex surface facing the object side. At least one of the first, second and third lenses is coated with a layer of optical film for filtering light.

10 Claims, 1 Drawing Sheet

IMAGE-FORMING LENS SET

BACKGROUND OF THE INVENTION

1. Field of the Invention

The present invention relates generally to image-forming lenses and more particularly, to an image-forming lens set having a plurality of lenses.

2. Description of the Related Art

Following fast development of multimedia technology, image-forming lenses have been intensively used in a variety of mobile electronic products such as digital camera, mobile camera telephone, personal digital assistant (PDA), and etc., for picking up images.

Further, to satisfy the requirements of high-tech product users for better convenience, quality and utility, high-tech products must be small-sized while maintaining the quality and lowering the cost. Image-forming lens sets encounter the same market challenge, i.e., image-forming lens sets must have a simple structure design to lower the cost and reduce the aberrations so as to improve the quality and reduce the size, satisfying the requirement for better product utility.

SUMMARY OF THE INVENTION

The present invention has been accomplished under the circumstances in view. It is one objective of the present invention to provide a simple structure of image-forming lens set that is easy and inexpensive to manufacture and that provides a high image quality.

To achieve this objective of the present invention, the image-forming lens set comprises an aperture stop, a first lens with positive power, a second lens with negative power and a third lens, which are arranged along an optical axis from an object side toward an image side in order. The first lens has two opposite surfaces including a convex surface facing the object side, and at least one of the two opposite surfaces is a non-spherical surface. The second lens is a convex-concave lens having two opposite surfaces including a concave surface facing the object side, and at least one of the two opposite surfaces of the second lens is a non-spherical surface. The third lens has negative refractive power becoming greater from a center to a periphery of positive refractive power; the third lens has two non-spherical opposite surfaces including a convex surface facing the object side. At least one of the first, second and third lenses is coated with a layer of optical film for filtering light. By means of the lenses having non-spherical surfaces, the image-forming lens set has a simple structure. By means of the optical film, the image formed in a better quality can achieve.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus is not limitative of the present invention, and wherein.

DETAILED DESCRIPTION OF THE INVENTION

Figure 1:
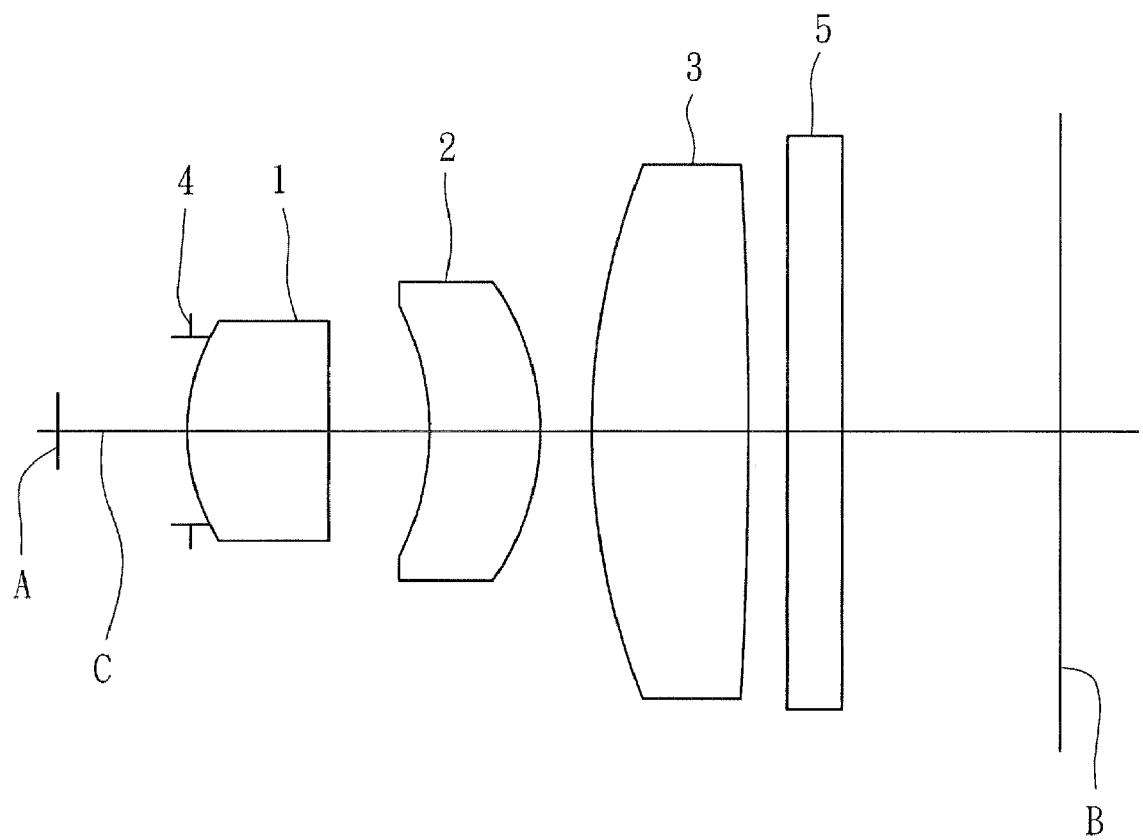
FIG. 1 is a schematic drawing showing the structure of an image-forming lens set according to a preferred embodiment of the present invention.

Referring to the annexed drawing of FIG. 1, an image-forming lens set in accordance with the present invention is shown comprising a first lens 1, a second lens 2, a third lens 3, and an aperture stop 4.

The component parts of the image-forming lens set are arranged from the object side A to the image side B (the image forming surface of the image sensor of charge coupled device (CCD) or complementary metal-oxide semi-conductor (CMOS)) along an optical axis C in the order of: the aperture stop 4, the first lens 1, the second lens 2, and the third lens 3. The first lens 1, which is a plano-convex lens with positive power, has two opposite surfaces, at least one of which is a non-spherical surface. The surface of the first lens 1 that faces the object side A is a convex surface. Further, the first lens 1 is coated with a layer of optical film (anti-reflective film) to enhance light transmission. The second lens 2, which is a convex-concave lens with negative power, has two opposite surfaces, at least one of which is a non-spherical surface. The surface of the second lens 2 that faces the object side A is a concave surface. Further, the second lens 2 is coated with a layer of anti-reflective film to enhance light transmission. The third lens 3 has two non-spherical opposite surfaces. The surface of the third lens 3 that faces the object side A is a convex surface. The third lens 3 has negative refractive power that becomes greater gradually from the center where the optical axis C passes through toward the periphery of third lens with positive refractive power. That is, the refractive power of the third lens 3 is gradually changed from the negative refractive power at the center of the third lens 3 to the positive refractive power at the periphery of the third lens 3. Further, the third lens 3 is coated with a layer of anti-reflective film to enhance light transmission.

The aforesaid image-forming lens set satisfies the following equation.

$$0.2 < (|R21|/|R22|) < 1.5 \quad \text{[Equation 1]}$$

in which:

R21 is the radius of curvature of the surface of the second lens 2 that faces the object side A;

R22 is the radius of curvature of the surface of the second lens 2 that faces the image side B; and the unit of radius of curvature is millimeter.

$$-1.5 \leq (F1+F2)/F \leq 0.3 \quad \text{[Equation 2]}$$

in which:

F1 is the effective focal length of the first lens 1;

F2 is the effective focal length of the second lens 2; and

F is the effective focal length of the image-forming lens set.

$$20.5 < V2 < 35.3 \quad \text{[Equation 3]}$$

in which V2 is the dispersion coefficient of the second lens 2.

$$45.3 < V3 < 56.3 \quad \text{[Equation 4]}$$

in which V3 is the dispersion coefficient of the third lens 3.

By means of the non-spherical first lens 1, second lens 2 and third lens 3 to constitute an image-forming lens set, the invention has a simple structure and provides an optical aberration correcting effect.

Further, because the first lens 1, the second lens 2 and the third lens 3 are respectively coated with a layer of anti-reflective film to enhance light transmission, the image-forming lens set can obtains an optimal image quality.

Further, a planar fourth lens 5 of glass may be set between the third lens 3 and the image side B to greatly improve the modulation transfer function (MTF) of the image forming lens set, thereby minimizing spherical aberration, distortion aberration, curvature of field and coma aberration. Further, the surface of the fourth lens 5 is coated with a layer of optical film (filter) that interferes with or absorbs wavelength that is not sensitive to human eyes so as to reduce scattered signal during image forming, thereby obtaining a better image quality. In practice, the first lens 1, the second lens 2 and the third lens 3 can be respectively coated with a layer of optical film for filtering light, achieving the same effect. When one of the first, second and third lenses 1-3 is coated with a layer of filter film, the aforesaid fourth lens 5 can be eliminated to simplify the structure.

Further, a protective glass may be set between the third lens 3 and the image side B, or the fourth lens 5 may be used for direct protection against external particles, thereby obtaining a better image quality.

Further, because the second lens 2 has negative power, the thickness of the center where the optical axis C passes through can be relatively reduced to shorten the total length of the image-forming lens set, thereby reducing the size.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image-forming lens set comprising an aperture stop, a first lens with positive power, a second lens with negative power and a third lens, which are arranged along an optical axis from an object side toward an image side in order;
    wherein the first lens has two opposite surfaces including a convex surface facing the object side, and at least one of the two opposite surfaces is a non-spherical surface;
    wherein the second lens is a convex-concave lens having two opposite surfaces including a concave surface facing the object side, and at least one of the two opposite surfaces of the second lens is a non-spherical surface;
    wherein the third lens has negative refractive power becoming greater from a center to a periphery of positive refractive power; the third lens has two non-spherical opposite surfaces including a convex surface facing the object side; and
    wherein at least one of the first, second and third lenses is coated with a layer of optical film for filtering light.

2. The image-forming lens set as claimed in claim 1, which satisfies the Equation 1 as follows:

$$0.2 < (|R21|/|R22|) < 1.5 \quad \text{[Equation 1]}$$

in which:
    R21 is the radius of curvature of the surface of the second lens that faces the object side; and
    R22 is the radius of curvature of the surface of the second lens that faces the image side.

3. The image-forming lens set as claimed in claim 1, which satisfies the Equation 2 as follows:

$$-1.5 \leq (F1+F2)/F \leq 0.3 \quad \text{[Equation 2]}$$

in which:
    F1 is the effective focal length of the first lens;
    F2 is the effective focal length of the second lens; and
    F is the effective focal length of the image-forming lens set.

4. The image-forming lens set as claimed in claim 1, which satisfies the Equation 3 as follows:

$$20.5 < V2 < 35.3 \quad \text{[Equation 3]}$$

in which V2 is the dispersion coefficient of the second lens.

5. The image-forming lens set as claimed in claim 1, which satisfies the Equation 4 as follows:

$$45.3 < V3 < 56.3 \quad \text{[Equation 4]}$$

in which V3 is the dispersion coefficient of the third lens.

6. The image-forming lens set as claimed in claim 1, wherein one of the first, second and third lenses is coated with a layer of optical film for enhancing light transmission.

7. The image-forming lens set as claimed in claim 1, further comprising a protective glass located between the third lens and the image side.

8. An image-forming lens set comprising an aperture stop, a first lens with positive power, a second lens with negative power, a third lens and a fourth lens, which are arranged along an optical axis from an object side toward an image side in order;
    wherein the first lens has two opposite surfaces including a convex surface facing the object side, and at least one of the two opposite surfaces is a non-spherical surface;
    wherein the second lens is a convex-concave lens having two opposite surfaces including a concave surface facing the object side, and at least one of the two opposite surfaces of the second lens is a non-spherical surface;
    wherein the third lens has negative refractive power becoming greater from a center to a periphery of positive refractive power; the third lens has two non-spherical opposite surfaces including a convex surface facing the object side; and
    wherein the fourth lens is coated with a layer of optical film for filtering light.

9. The image-forming lens set as claimed in claim 8, wherein the fourth lens is a planar lens made of glass.

10. The image-forming lens set as claimed in claim 8, wherein at least one of the first, second and third lenses is coated with a layer of optical film for enhancing light transmission.

* * * * *